(12) United States Patent
Al-Mousa

(10) Patent No.: US 11,256,824 B2
(45) Date of Patent: Feb. 22, 2022

(54) SECURING DATABASE BACKUPS WITH UNIQUE GLOBAL IDENTIFIER

(71) Applicant: Saudi Arabian Oil Company, Dhahran (SA)

(72) Inventor: Emad Mohammad Al-Mousa, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 413 days.

(21) Appl. No.: 16/532,691

(22) Filed: Aug. 6, 2019

(65) Prior Publication Data

US 2021/0042437 A1 Feb. 11, 2021

(51) Int. Cl.
| | |
|---|---|
| *G06F 21/00* | (2013.01) |
| *G06F 21/62* | (2013.01) |
| *G06F 16/245* | (2019.01) |
| *G06F 11/14* | (2006.01) |
| *G06F 21/60* | (2013.01) |
| *G06F 21/79* | (2013.01) |
| *H04L 9/06* | (2006.01) |

(52) U.S. Cl.
CPC ...... *G06F 21/6227* (2013.01); *G06F 11/1469* (2013.01); *G06F 16/245* (2019.01); *G06F 21/602* (2013.01); *G06F 21/79* (2013.01); *H04L 9/0643* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 6,651,077 | B1 * | 11/2003 | East | G06F 11/1469 |
| 8,245,026 | B1 * | 8/2012 | Moore | G06F 21/45 |
| | | | | 713/2 |
| 8,661,259 | B2 | 2/2014 | Yocom-Piatt et al. | |
| 8,667,273 | B1 | 3/2014 | Billstrom et al. | |
| 9,934,388 | B2 | 4/2018 | Elovici et al. | |
| 2002/0091930 | A1 * | 7/2002 | Kohl | H04L 9/0894 |
| | | | | 713/182 |

* cited by examiner

*Primary Examiner* — Andrew J Steinle
(74) *Attorney, Agent, or Firm* — Leason Ellis LLP

(57) ABSTRACT

A method and system for performing secure database backups with a globally unique identifier to prevent unauthorized access to or restoration of backup data are provided, wherein a first database management system (DBMS) generates an instance of a database and a corresponding globally unique identifier (GUID) to uniquely identify and secure the database instance. The first DBMS uses a hash function to generate a hash of the GUID, which is then stored in association with the database instance. Encrypted backup sets of the database instance are generated by the first DBMS, wherein the GUID is encrypted and stored in association with each backup set. The first DBMS encodes each encrypted backup set to require that a second or subsequent DBMS possess the identical GUID associated with the database instance before any attempt to access or restore the backup set is permitted.

10 Claims, 4 Drawing Sheets

SECURING DATABASE BACKUPS WITH UNIQUE GLOBAL IDENTIFIER

FIELD OF THE DISCLOSURE

This patent application generally relates to protecting database backups against unauthorized access and theft of data. More particularly, the present disclosure provides methods and systems in which hashed globally unique identifiers (GUID) are embedded in each database instance of a given database management system (DBMS) and in which a different DBMS can only access or restore the backup if it possesses the identical GUID associated with the database instance.

BACKGROUND AND SUMMARY OF THE DISCLOSURE

Database systems typically include security protocols such as user authentication and access permissions. However, even with these measures in place, databases are still vulnerable to occurrences that can lead to a breach. Hackers from outside of an enterprise can surreptitiously siphon away data, an occurrence that's often not detected until well after the event. This can happen at any of several points in the lifespan of data in a standard enterprise client-server arrangement, as the data that resides in databases has the following natural states: data-in-motion, data-in-use, and data-at-rest. When client and server are not co-located, which is typical, a state of data-in-motion exists wherein data must transit the Internet. Security for this data traffic over public infrastructure is accomplished by using the set of encryption facilities and protocols known as Transport Layer Security (TLS), formerly known as the Secure Socket Layer (SSL). These protocols include the use of encryption algorithms to make data unusable by unauthorized entities and cryptographic keys that enable decryption of the data by duly-authorized parties. Even with these advanced security features, breaches have occurred that exploit vulnerabilities that exist in the standard protocols.

Regarding the data-in-use state, it is sometimes possible for an attacker to bypass enterprise safeguards and directly access data in the working memory of a database server, resulting in the compromise and theft of sensitive information.

Even data-at-rest, which refers to all data resident on the database server, except for that data which is currently traversing a network or which is temporarily residing in the server's memory, is not safe from theft. U.S. Pat. No. 9,934,388 proposes a solution to this technical problem by including a dedicated encryption module inside a Database Management System (DBMS), at a layer above the database cache. All necessary encryption keys are made accessible to the server during a valid user session, and the keys are retained only in the server's memory during the session. The encryption secures the data against an intruder breaking into the database, and for the same reason only an encrypted form of the data is stored on the backup site, providing "data at rest" security. The encryption function takes both the value of a data point and the data point's position coordinates within the database as inputs to generate the data point's encrypted value. The solution of the '388 patent is internal to the database management system provided by this specific architecture. However, because this solution resides between the database cache and the query engine, it effectively remains within the boundaries of the DBMS platform whereas solutions in the art remain needed to protect backup sets once detached from DBMS oversight.

Given this threat environment that enterprises face in today's increasingly interconnected world, there is a need for a solution that will preserve informational security even when database backups exist detached from a DBMS. The present disclosure addresses this and other needs in the art of data security in a computer network.

BRIEF DESCRIPTION OF THE DRAWINGS

The accompanying drawing figures illustrate exemplary embodiments and are not intended to be limiting of the present disclosure. Among the drawing figures, like references are intended to refer to like or corresponding parts.

DETAILED DESCRIPTION OF CERTAIN EMBODIMENTS ACCORDING TO THE DISCLOSURE

Figure 1:
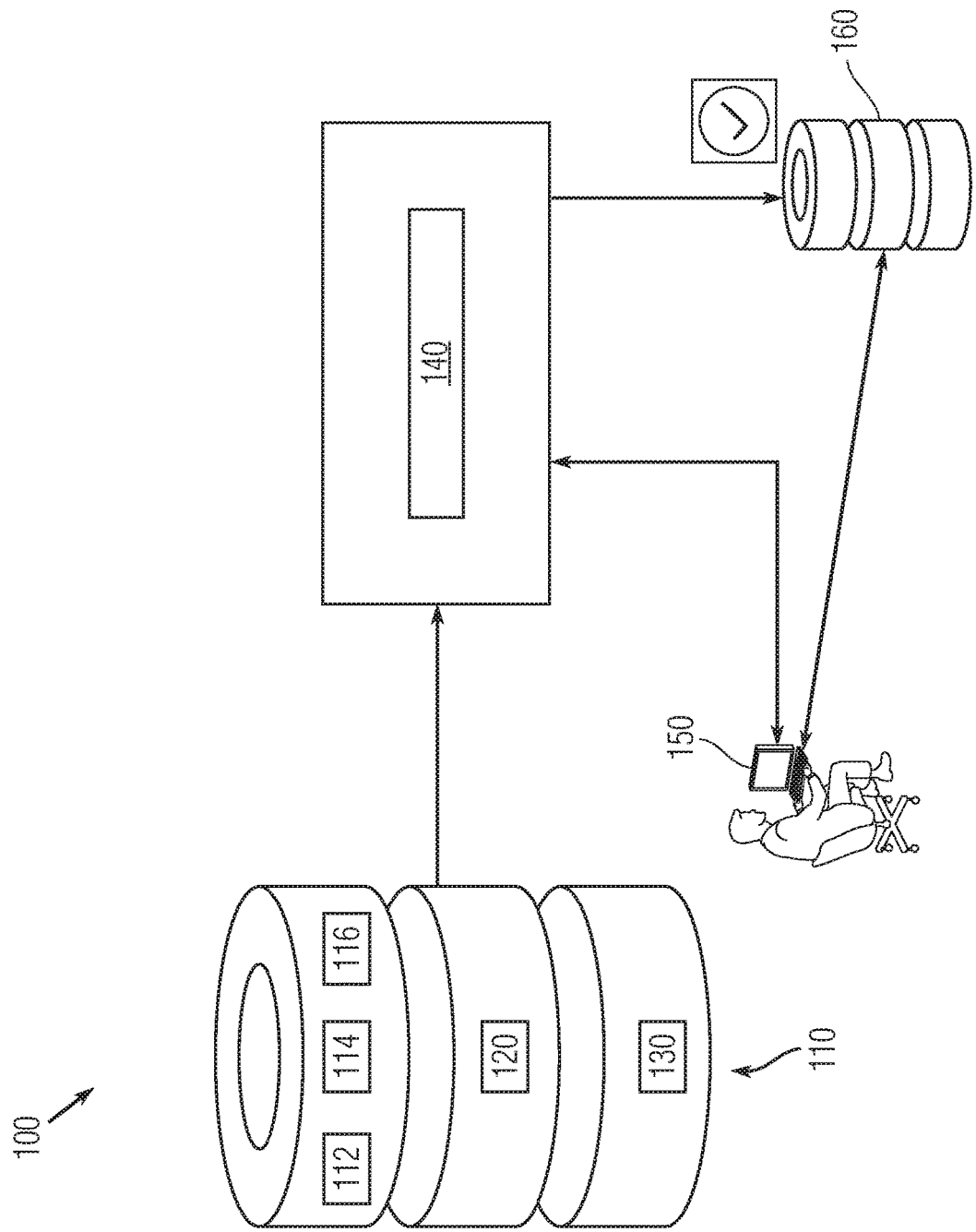
FIG. 1 illustrates a schematic overview of a prior art database system.

The methods and systems described herein concern a database management system (DBMS) which performs all conventional, core functions required of standard database systems while also incorporating novel features that provide individual database instances generated by the DBMS with stand-alone security against unauthorized attempts at access or restoration of the database to an unauthorized location. Fundamentally, a DBMS must enable storage and retrieval of data members comprising the database, as well as updates when the values of data members change. The present disclosure performs these functions and more, as its security features exceed those of the prior art by providing a DBMS capable of building database instances and backup sets that are encoded to be pre-hardened against unauthorized and potentially harmful interactions with other systems.

In particular, a DBMS according to the present disclosure secures database backups, which in many cases are no longer under oversight of the DBMS which had created the backup in the first place, against unauthorized theft and reproduction by using a global unique identifier (GUID) that is specific to each database instance. An attacker who manages to steal a database backup, but who does not have the GUID associated with that database, will not be able to restore the misappropriated backup to an external database instance. As such, the disclosure provides a method to prevent data exfiltration in the event of a stolen database backup.

As such, while there is a desire in the data industry to create data backups for information redundancy in case of data corruption or for other reasons, there is problem resulting from the backup media having been separated from the source (the DBMS) and residing on a storage system separate from the database. The risk is that such backups can be processed in any environment comparable to the DB which had generated it. The concern is that many scenarios exist which can result in an unauthorized replication of the database, since there are no controls set within the media itself to protect it from being restored to a compatible platform. Although the data can be encrypted in the backup set, that is not always an enforced requirement, nor does it render the media unusable. That means metadata and even the data itself can be salvaged from the backup set.

The technical solution provided by the present disclosure includes a first DBMS comprising code executing or otherwise implemented (e.g., a script) in a hardware processor to configure the processor to perform a one-time generation of a unique GUID to be associated with each database instance that is generated by the first DBMS. In one embodiment the DBMS can use predefined seed values, such as the server's MAC address and the timestamp associated with the creation of the database, to generate the GUID. The GUID can then be masked by storing it in obfuscated form within the generated database instance. In some implementations, the code generates a hash of the GUID using a hash function. The GUID hash is stored in association with a given database instance. For instance, it can be stored in association with a given database instance by having the GUID or the GUID hash included in a header of the database. In connection with normal operation of the DBMS, one or more encrypted backup sets of the database are created, with each having a GUID or GUID hash encrypted and stored in association with the backup set.

The first DBMS encodes each such backup set to require any second or subsequent DBMS attempting to interact with the backup set to possess the identical GUID associated with the database instance or order to access or attempt a restore operation of the that backup of the database. When a second DBMS attempts to interact with a given database backup set generated by the first DBMS, the backup set rejects such attempts unless there has been a verification that the second DBMS possesses the GUID associated with the backup set. The first DBMS-encoded backup set directs the operating system to decrypt the GUID that is offered by the second DBMS in response to its query, and then compares it with the value corresponding to that database instance that has been registered in a database system table. If the second DBMS responds to a query from the backup set with the correct GUID or GUID hash, then the backup set allows access or restoration by the second DBMS. Otherwise, the backup set terminates the interaction with the second DBMS with no backup data having been exchanged. In this way, absolute data security is maintained even in the event of database backup set expropriation.

Referring now to FIG. 1, a schematic diagram is shown of a network 100 incorporating a prior art database system 110. The database system 110 is a computer system comprising at least one processor 112, at least one memory 114, and at least one storage medium 116. The database system 110 includes a database management system (DBMS) 120 comprising software executing on the system 110 which is configured to generate database instances 130, enable and control access to the databases, and provide facilities for operations on the data comprising the database (e.g., read, write, replace operations). One or more backup sets 140 can be generated by the DBMS 120, which is intended to be accessible only to authorized entities. When separated from the DBMS 120 that generated the backup set 140, the prior art backup set 140 has no built-in, standalone security features to prevent an attacker from accessing the data or restoring the database backup set 140 to a compatible database system in an attacker's possession.

Enforcement of access and activity controls for the network 100 is provided by a network security system that typically comprises a combination of firewall, anti-virus software and intrusion prevention system technologies (not shown). These measures are usually sufficient to defeat most external threats to an enterprise. However, in the present age of cyber theft and cyberwarfare, data breaches by entities having ill intent are in the headlines almost daily. There is a distinct population in the world that includes both individuals and nation-states whose objective can be to overcome these defenses. FIG. 1 illustrates a scenario in which an attacker at a computer 150 has managed to penetrate the network security system that is tasked with protecting the network 100. The attacker has accessed a database backup set 140 that is hosted on the target network 100. The attacker, once having penetrated the network 100, is able to restore to a conventional DBMS under its control the backup set 140 and has an operational local database instance 160 of the database which belongs to the entity that has just been attacked, Turning now to FIG. 2, a schematic diagram of a network 200 is illustrated which incorporates a database system 210 according to one implementation of the present disclosure. The database system 210 is a computer system comprising at least one processor 212, at least one memory 214, and at least one storage medium 216, all of which can be no different than a conventional DBMS such as described above. The database system 210 includes a first database management system (DBMS) 220 comprising software executing or otherwise implemented on the system 210 which is configured to generate database instances 230, enable and control access to the databases, to provide facilities for operations on the data comprising the database, and, in accordance with a salient aspect of the present disclosure, generate a globally unique identifier (GUID) 250 that uniquely identifies each database instance and serves an enabling role in the improved security of backup sets once created and stored separate from the database system 210 or its DBMS 220. Each time the first DBMS 220 generates a database instance 230, it also generates the GUID 250 which, as noted, uniquely identifies the database instance and secures the backup set 240 from unauthorized access. The first DBMS 220, executing or otherwise implementing code in the processor 212, applies a hash function via the processor to generate a hash 260 of the GUID 250 which is stored in association with the database instance 230 that has been created. According to an embodiment of the disclosure, the GUID or a GUID hash is stored in a header block 270 of the database instance 230. In accordance with the disclosure, the GUID or a GUID hash is also stored in a header block 270 of each backup set 240.

Figure 2:
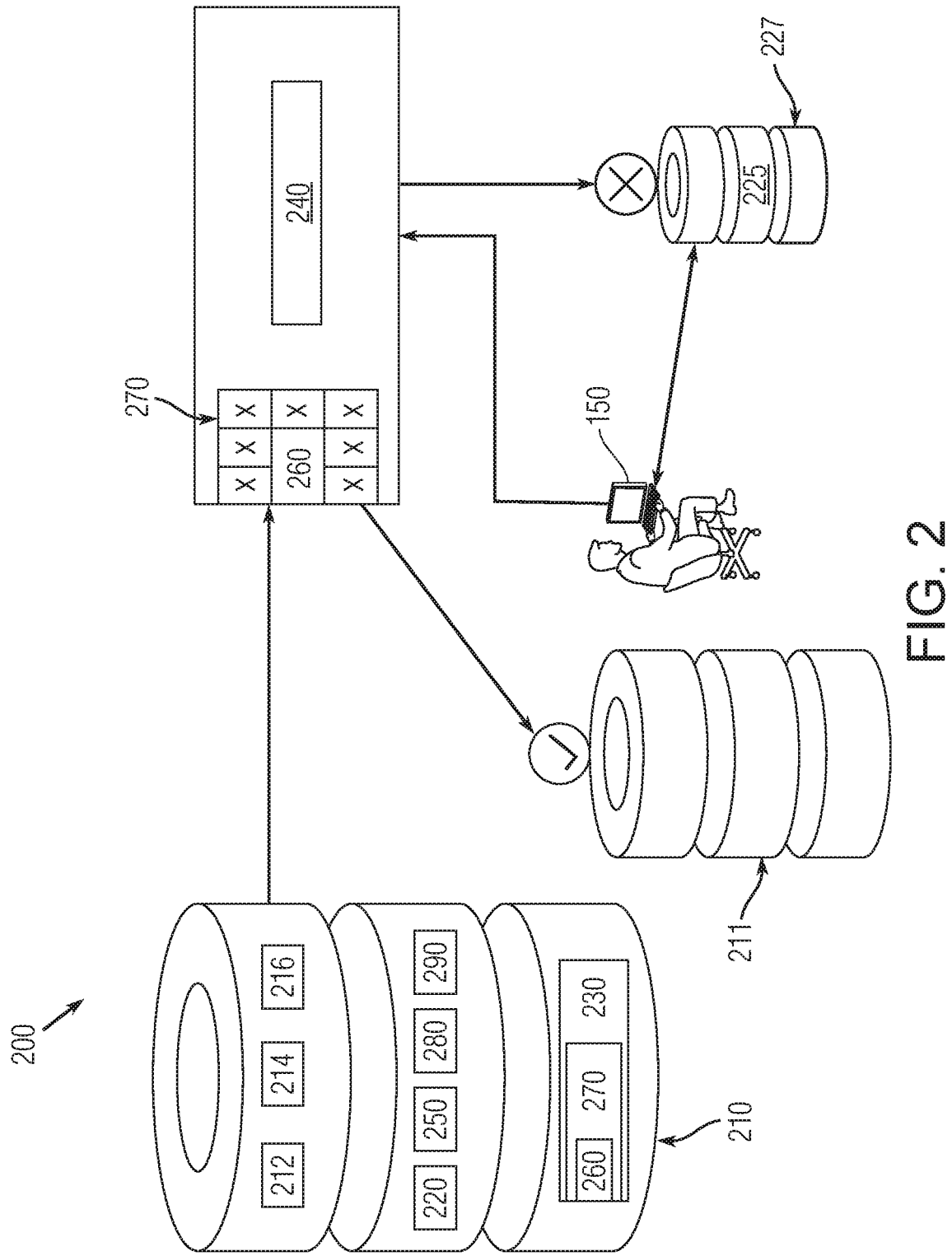
FIG. 2 illustrates a schematic view of the database system of the present disclosure.

With continued reference to FIG. 2, the first DBMS 220 is further configured by code executing in the processor 212 to generate one or more encrypted backup sets 240 of the database instance 230 and to store an encrypted GUID 250 or an encrypted GUID hash in the encrypted backup set 240. The first DBMS 220 creates secure backup sets 240 by encoding each backup set 240 to utilize operating system authentication or database native authentication to require that a second or subsequent DBMS 225 of a second database system 227 possess the identical GUID 250 associated with the database instance 230 before allowing any access or restoration of the database. As such, the attacker 150 in this instance, even assuming it can penetrate the network 200— which can have any combination of firewall, anti-virus software and intrusion prevention system technologies as in network 100, even if the attacker obtains a copy of a backup set 240, a second DBMS 225 under its control will not be able to mount, access or otherwise benefit at computer 150 from the data breach. On the other hand, an authorized further database system 211, which can be constructed the same as database system 210, if it possess the identical GUID 250 associated with the database instance 230 which has been detached and saved separately as a full backup set 240 will be enabled to access or restore the database because it can match the GUID and satisfy the security criterion of the present disclosure.

An attempted communication session between a backup set 240 created by first DBMS 220 and a subsequent unknown DBMS 225 operated by an attacker 150 proceeds as follows. A second DBMS 225 of unknown security status attempts to access or perform a restore operation of the backup set 240. The second (external) database system 227 has a DBMS 225 which first attempts to decrypt the GUID embedded in the backup 240 and compare it with the current database Unique Global Identifier value. If the two values do not match, the restore process is aborted immediately and data recovery by the attacker 150 is not possible. It should be noted that any attempts by the attacker to change the Unique Global Identifier value within his database system 227 to match that of the target database instance will fail, as the GUID value is embedded in the database system dictionary or system table. It is virtually impossible to manipulate or change the contents of the database system dictionary without corrupting the database itself, making it unusable. Furthermore, any attempts to manipulate the target backup set 240 will cause read-write operational errors that completely prevent database restore operations.

The GUID 260 is written in an encrypted format within each generated backup set 240. As a result, a daily, full database backup will have this unique value embedded, regardless if the backup is placed on storage sub-system or tape. The header 270 of the backup set 240 stores the GUID 260 in an encrypted format. In the event of a backup set being stolen or otherwise misappropriated, the attacker who has it will not be able to restore the backup to a second DBMS 225 because the restore process requires a matching Unique Global Identifier (GUID) to be presented.

The use of a DBMS-generated GUID poses a risk, however slim, that an unknown or suspect entity could generate and possess the same GUID, such as by a brute force approach to testing possible GUID values. In response to this risk, an additional aspect of the present disclosure is that the first DBMS 220 is further configured to minimize the probability that a second, possibly suspect DBMS 225 could randomly generate or be assigned a second DBMS GUID 255 that has a value identical to the backup set GUID 250 by specifying that the GUID 250 be at least a 128-bit number, or even a substantially larger binary number.

Figure 3:
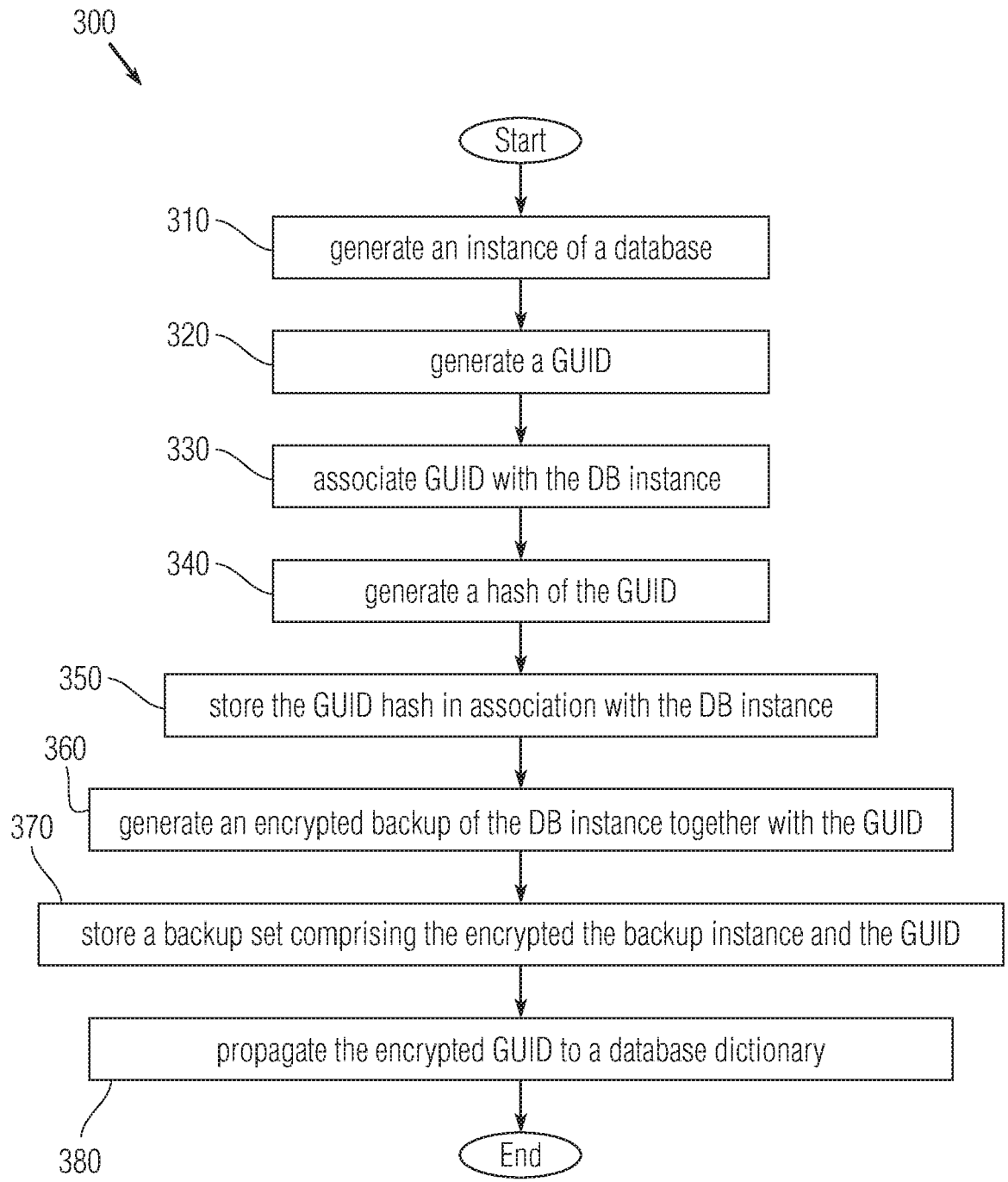
FIG. 3 illustrates a method in accordance with the disclosure which can be implemented to create a backup set.

FIG. 3 illustrates a method 300 in accordance with the disclosure which can be implemented to create a backup set 240 using a first DBMS 220, as described above, which is able to provide security to prevent access or restore by an unauthorized DBMS 225 while permitting any authorized database systems 210, 212 to access or restore the data in the backup set. At step 310, from time to time, the DBMS 220 can generate an instance of a database 230 for use by an enterprise. A globally unique identifier (GUID) 260 is generated at step 320, as described above, and associated with and uniquely identify the database instance at step 330. A hash of the GUID is generated by the DBMS applying a hash function to the generated GUID, as described above and indicated at step 340. The GUID hash 260 is then stored in association with the database instance 230, as indicated at step 350. Optionally, the GUID hash can be stored in a header block 270 of the database instance. As desired or required by a policy or script that can be implemented without human intervention, one or more encrypted backup sets 240 of the database instance 230 are generated, together with the GUID, or a GUID hash, at step 360. A backup set comprising the encrypted backup instance and the GUID (or GUID hash), is stored at step 370.

In a more particular implementation of the foregoing method, additional steps can be performed. As an example, the method 300 can further comprise, in some embodiments, step 380 in which the encrypted GUID of the database instance 230 is propagated to a database dictionary maintained by the first DBMS 220. This step or a further step can include propagating the encrypted GUID to a backup metadata set maintained by the first DBMS 220.

Figure 4:
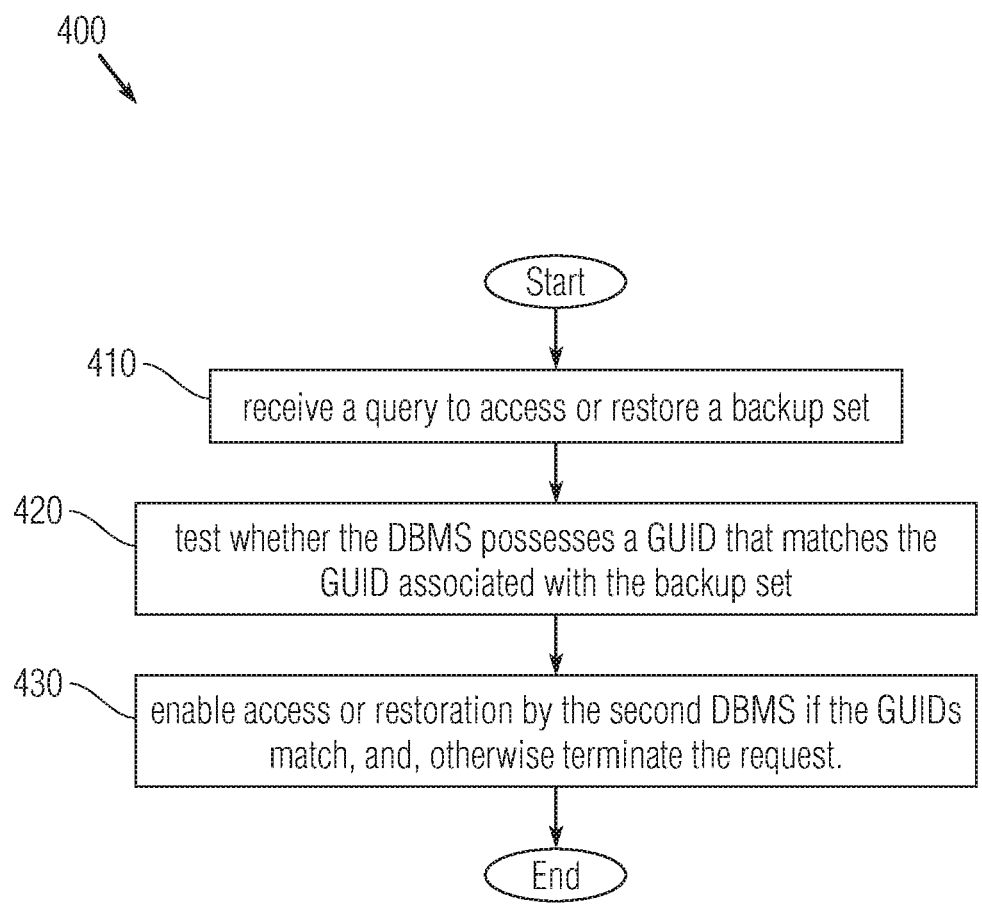
FIG. 4 illustrates a method in accordance with the disclosure which can be restore a database instance from a backup set.

Turning now to FIG. 4, this figure illustrates a method 400 in accordance with the disclosure which can be restore a database instance from a backup set. The encrypted backup set 240 created and stored at step 370 is encoded by the first DBMS so as to require a second or subsequent DBMS to possess the identical GUID associated with the database instance to access or attempt a restore operation of the database. At step 410, a query is received at the backup set 240 from a database system, such as database systems 210, 211, or 225. The query can be an attempt to access or perform a restore operation of the backup set on a database system. Initially, the request is from a database system of unknown security status. At step 420, the backup set tests the database system, and more particularly its DBMS to determine if it possesses a GUID that matches the GUID associated with the backup set. At step 430, the backup set enables access or restoration by the second DBMS if the GUIDs match. Such is the situation when the second database system is an authorized one, such as database system 211. On the other hand, if the GUIDs do not match, the request by the second DBMS to access or restore is terminated and no data from the encrypted database backup set 240 is exchanged with the second DBMS. Such is the situation when the second database system is an unauthorized one, such as database system 227.

A further aspect of the present disclosure is that the first DBMS 220 is further configured to propagate the database instance's 230 encrypted GUID 260 to a database dictionary 280 maintained by the first DBMS 220 and to a backup metadata set 290 maintained by the first DBMS 220. This dictionary can be maintained as a master dictionary to approve access to or restoration of a backup set 240, through standard query/response interaction. The backup data set security arrangement described above does not impact conventional database architectural requirements. For example, database transactions can be logged in log format which is transportable to a standby database for synchronization purposes even if the standby database has a different Unique Global Identifier value. Likewise, incremental and differential backups are not impacted by the proposed technical solution to protect database backups once saved separate from the DBMS because the Unique Global Identifier values are not embedded in them; these are useless for data recovery without a full database backup as a base.

As a further advantage, the database security arrangement described herein greatly strengthens security posture for any database system hosting confidential information in a locked-down secure environment, in which firewall and network communication is limited. In addition, the proposed system and method for protecting database backups has many advantages such as no hardware dependency. For example, no special storage sub-system is required.

The invention encompassed by the present disclosure has been described with reference to the accompanying drawings, which form a part hereof, and which show, by way of illustration, example implementations and/or embodiments. As such, the figures and examples above are not meant to limit the scope of the present application to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present application have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

What is claimed:

1. A method for performing secure database backups using a globally unique identifier to prevent unauthorized access to or restoration of backup data, the method comprising:
    using a first database management system (DBMS) to generate an instance of a database;
    generating a globally unique identifier (GUID) to associate with and uniquely identify the database instance;
    generating a hash of the GUID using a hash function;
    storing the GUID hash in association with the database instance; and
    generating one or more encrypted backup sets of the database instance, wherein the GUID is encrypted and stored in the backup set, and wherein the encrypted backup set is encoded by the first DBMS to require a second or subsequent DBMS to possess the identical GUID associated with the database instance to access or attempt a restore operation of the database.

2. The method of claim 1, further comprising storing the GUID hash in a header block of the database instance.

3. The method of claim 1, further comprising propagating the database instance's encrypted GUID to a database dictionary maintained by the first DBMS and to a backup metadata set maintained by the first DBMS.

4. The method of claim 1, wherein a subsequent restore process of the database instance comprises the following steps:
    a second DBMS of unknown security status attempts to access or perform a restore operation of the backup set;
    the backup set, according to its encoding by the first DBMS, queries the second DBMS to determine if it possesses the GUID associated with the backup set;
    the backup set allows access or restoration by the second DBMS if the second DBMS responds to the query with the correct GUID associated with the backup set, otherwise the backup set terminates the interaction with the second DBMS with no backup data having been exchanged.

5. The method of claim 1, further comprising minimizing the probability that a second, possibly suspect DBMS will randomly generate or be assigned a second DBMS GUID that has a value identical to the backup set GUID by specifying that the GUID be at least a 128-bit number.

6. The method of claim 1, further comprising using the first DBMS to generate a globally unique identifier (GUID) to associate with and uniquely identify the database instance.

7. A system configured to perform secure database backups using a globally unique identifier to prevent unauthorized access to or restoration of backup data, the system comprising:
    a computer system comprising at least one processor, at least one memory, and at least one storage medium;
    a first database management system (DBMS) comprising software running on the computer system, the first DBMS configured to:
    generate an instance of a database;
    enable and control access to the database;
    provide facilities for operations on the data comprising the database;
    generate a globally unique identifier (GUID) to associate with and uniquely identify the database instance;

generate a hash of the GUID using a hash function;

store the GUID hash in association with the database instance; and generate one or more encrypted backup sets of the database instance, wherein the GUID is encrypted and stored in the backup set, and wherein the encrypted backup set is encoded by the first DBMS to require a second or subsequent DBMS to possess the identical GUID associated with the database instance to access or attempt a restore operation of the database.

8. The system of claim 7, wherein the first DBMS is further configured to store the GUID hash in a header block of the database instance.

9. The system of claim 7, wherein the first DBMS is further configured to propagate the database instance's encrypted GUID to a database dictionary maintained by the first DBMS and to a backup metadata set maintained by the first DBMS.

10. The system of claim 7, wherein the first DBMS is further configured to minimize the probability that a second, possibly suspect DBMS will randomly generate or be assigned a second DBMS GUID that has a value identical to the backup set GUID by specifying that the GUID be at least a 128-bit number.

* * * * *